July 7, 1942. W. H. BLOUNT ET AL 2,288,988
APPARATUS FOR CUTTING CABLES AND OTHER LONG ARTICLES
Original Filed Aug. 1, 1938  5 Sheets-Sheet 1

Witness
Herbert E. Covey

Inventors
William H. Blount
Clayton F. Fisher
By Clayton R. Jenks
Attorney

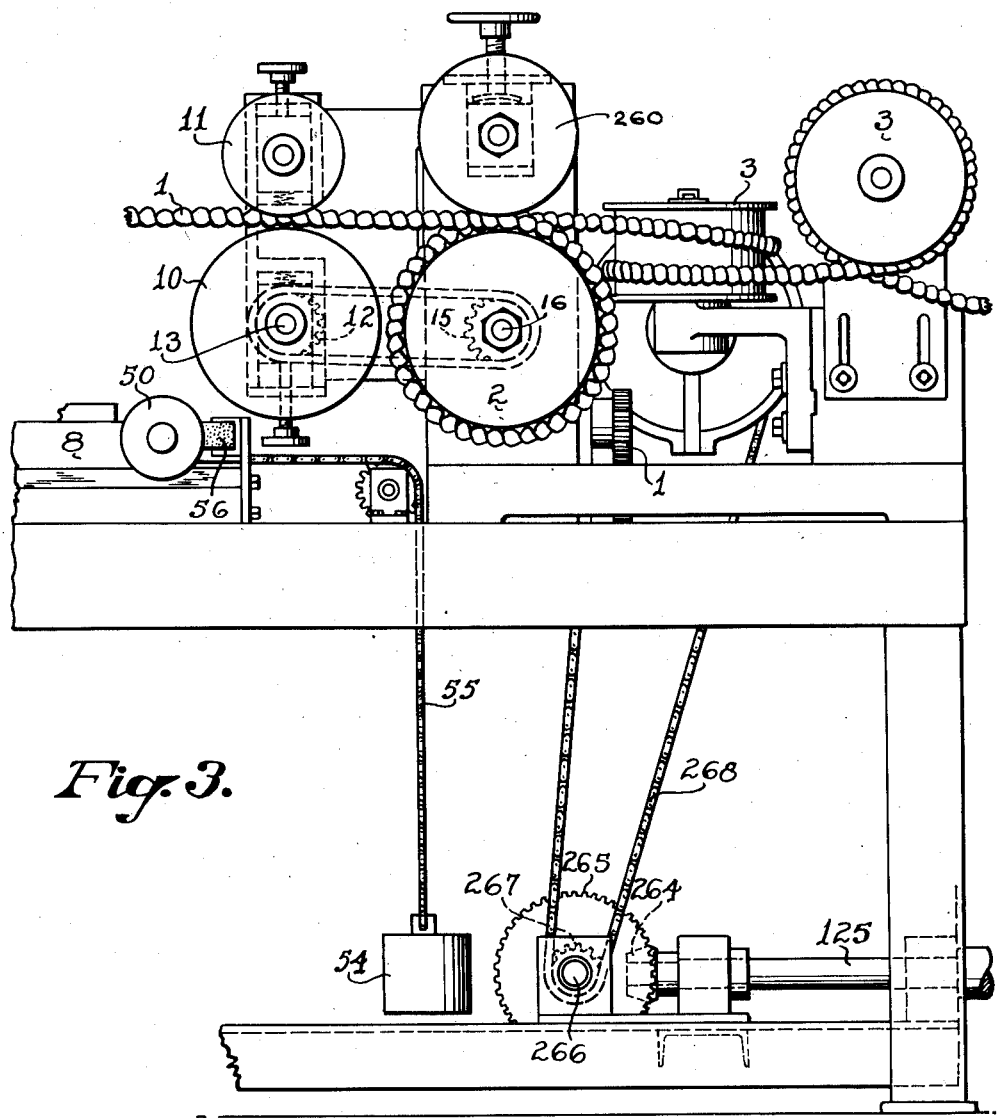

Inventors
William H. Blount
Clayton F. Fisher

Witness
Herbert E. Covey

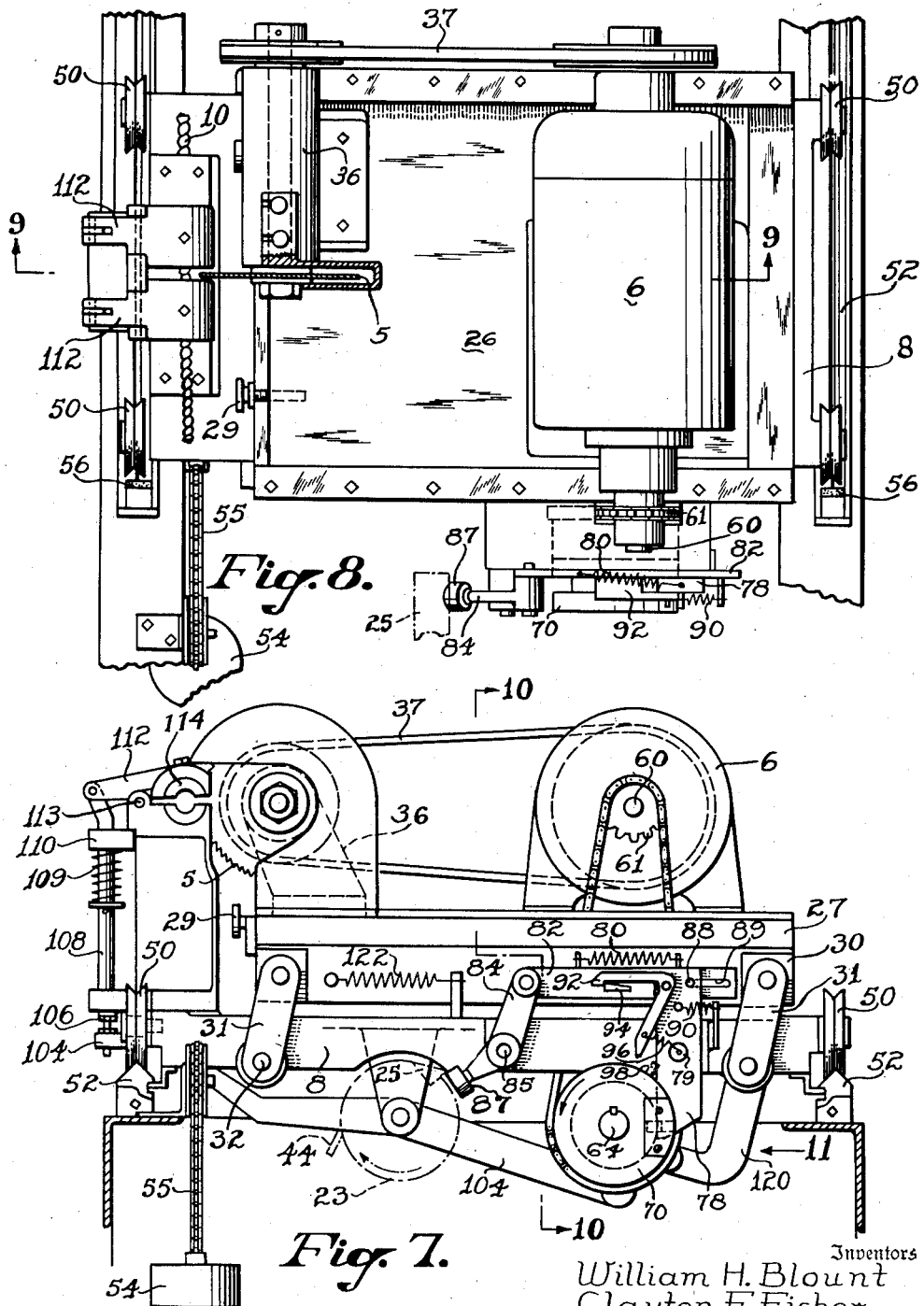

July 7, 1942.  W. H. BLOUNT ET AL  2,288,988
APPARATUS FOR CUTTING CABLES AND OTHER LONG ARTICLES
Original Filed Aug. 1, 1938  5 Sheets-Sheet 5
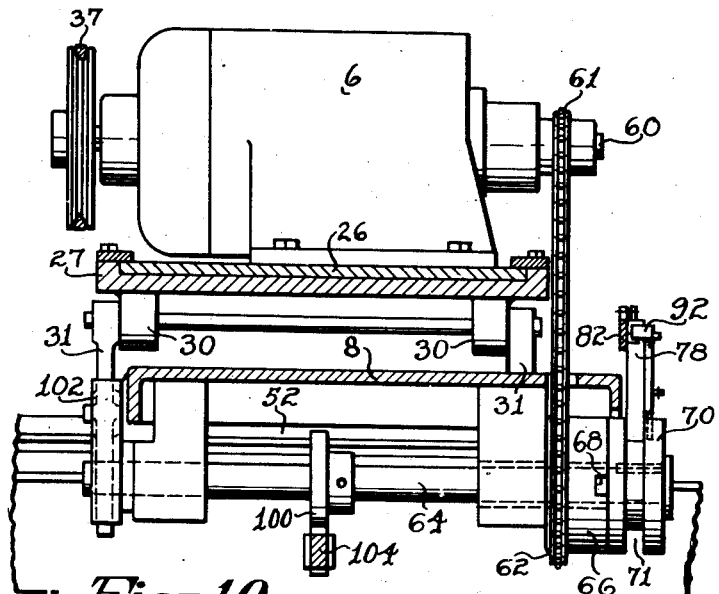
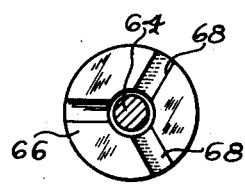
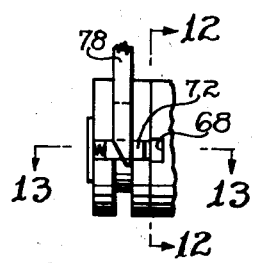
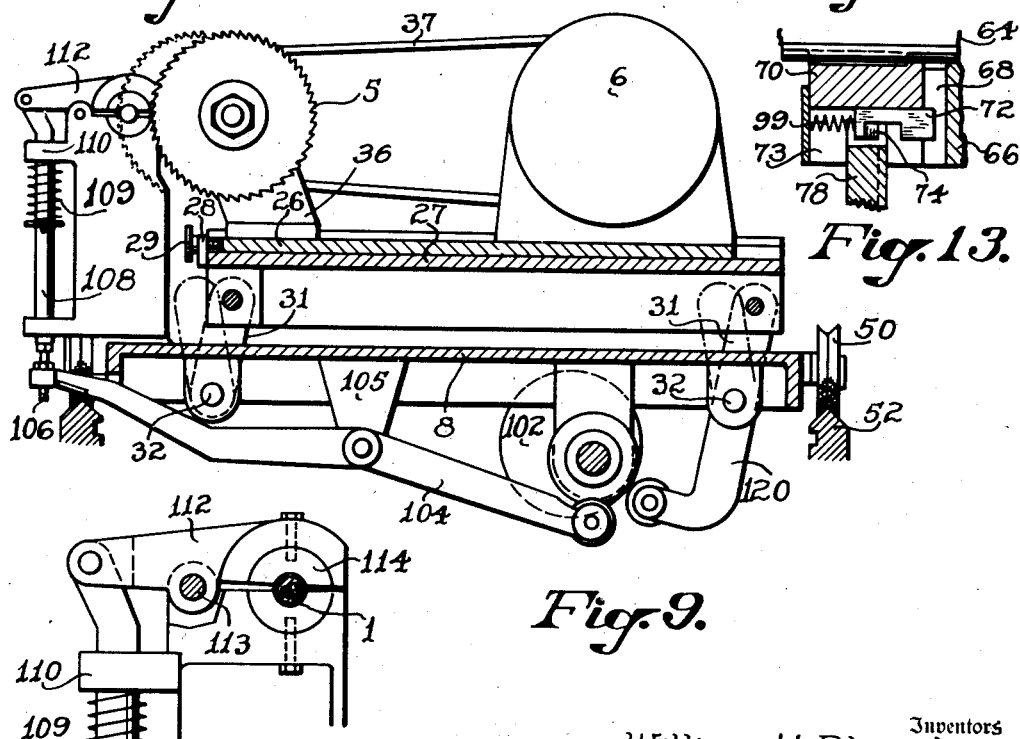
Inventors
William H. Blount
Clayton F. Fisher
Witness
Herbert E. Covey
Attorney Patented July 7, 1942

2,288,988

UNITED STATES PATENT OFFICE 2,288,988

APPARATUS FOR CUTTING CABLES AND OTHER LONG ARTICLES

William H. Blount, Worcester, and Clayton F. Fisher, Spencer, Mass., assignors to Sleeper & Hartley, Incorporated, Worcester, Mass., a corporation of Massachusetts Original application August 1, 1938, Serial No. 222,498. Divided and this application January 11, 1940, Serial No. 313,416

8 Claims. (Cl. 29—69)

This invention relates to an apparatus for cutting cables and other long articles, and more particularly to a device which will serve to cut a cable and the like in predetermined lengths while it is moving forward from a supply to a take up mechanism.

This case is a division of our copending application Serial No. 222,498 filed August 1, 1938, which describes and claims a cable armoring machine capable of twisting wires together to form a flexible cable and of wrapping an armor thereabout and finally measuring and cutting the cable in desired lengths as it moves forward continuously to take up reel mechanism which winds the cut lengths onto spools.

The present application relates to the mechanism which serves for cutting such a cable in predetermined lengths and which may be employed for cutting various other articles, such as rope, cable, wire, rods, tubes, rails and other long, shaped articles made of suitable material.

The primary object of this invention is accordingly to provide a cutting apparatus which will accomplish the above specified purpose and which in particular will sever a cable of indeterminate length into shorter pieces of desired lengths.

A further object of this invention is to provide an apparatus for cutting cable and the like which will sever the same as it is moving forward from one work station to another and without requiring the stoppage of any operation affecting that moving cable at either side of the cutting station. Further objects will be apparent in the following disclosure.

Referring to the drawings, which illustrate the preferred embodiment of this invention:

Fig. 3 is a front elevation, partly broken away, of the cable stretching and measuring mechanism, looking in the direction of the arrow 3 on Fig. 2;

Fig. 7 is a vertical elevation, partly in section, on the line 7—7 of Fig. 1;

Fig. 8 is a top plan view of the mechanism shown in Fig. 7;

Fig. 9 is a view on the line 9—9 of Fig. 8;

Fig. 10 is a sectional view on the line 10—10 of Fig. 7;

Fig. 11 is a fragmentary elevation looking in the direction of the arrow 11 in Fig. 7;

Fig. 12 is a sectional view on the line 12—12 of Fig. 11;

Fig. 13 is a sectional view on the line 13—13 of Fig. 11 showing the parts in operative positions; and Fig. 14 is an enlarged detail of parts shown in Fig. 9.

One type of cable which may be severed by apparatus of the present invention comprises insulated wires twisted together and wrapped with a flexible metal armoring strip interlocked around the insulated wires; and this may be accomplished by an apparatus of the type shown in the prior patent to Sleeper No. 1,703,251. This armored cable, which is commonly known in the trade as BX cable, is drawn by a capstan or other take up device through the twisting and armoring operations. Thereafter, the cable is passed to the device of the present invention which serves to cut the cable into desired lengths for winding on take up reels. The preferred type of measuring and cutting apparatus comprises a flying carriage carrying a cutting tool which is temporarily connected to the moving cable so that the carriage moves therewith during the period required for cutting the cable. To this end, the carriage carries clamping mechanism so arranged that, when the measuring device has indicated the right position for the cut, gripping members are caused to contact with the moving cable and to draw the carriage forward with the cable while the cutting device is moved to sever the cable. Thereafter, the clamps are disengaged from the wire and the carriage is returned automatically to its initial and inoperative position, while a new supply of cable passes forward to the coiling apparatus.

Figure 2:
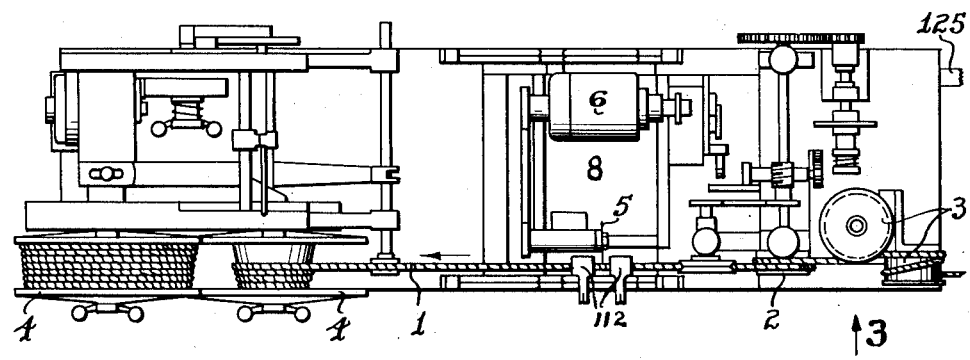
Fig. 2 is a plan view thereof.
Figure 1:
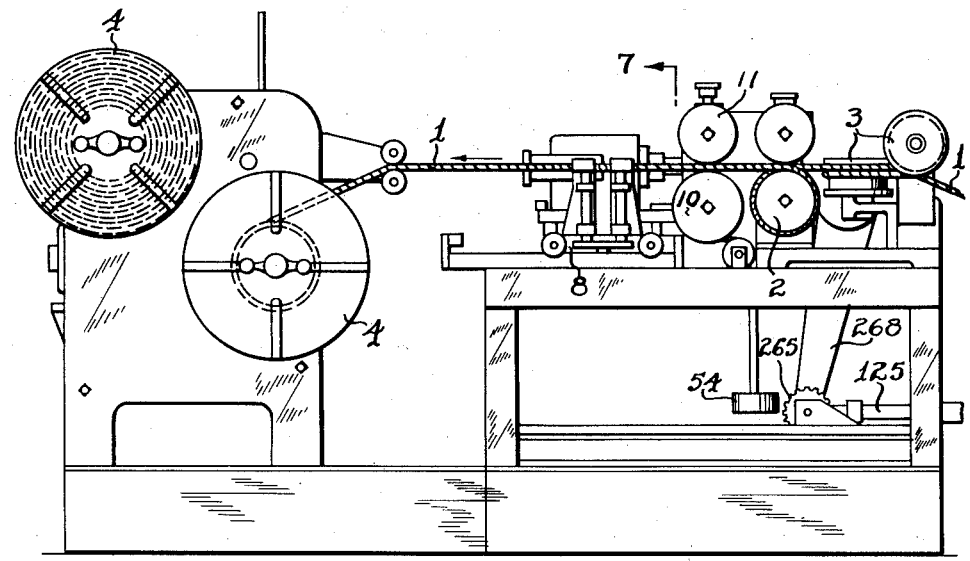
Fig. 1 is a front elevation of the machine.

Referring to Figs. 1 and 2 of the drawings, we have there shown the cable 1 as being drawn forward by a capstan 2 through cable flexing rolls 3 after it has come from an armoring machine. The cable is drawn forward continuously and without stoppage for an indefinite period of time and it is sent from the capstan 2 to the replaceable winding reels 4 which are so constructed and arranged as to wind up a predetermined length of cable, such as 100 feet on one reel and then another similar length on the other reel. In order that this cable may be wound on the reel without stopping the other operations, we have provided a cutter mechanism as herein described which serves to sever that cable when a predetermined length has been fed forward.

The cutting-off mechanism comprises a cutting device, such as a rotary steel or abrasive disk saw 5, of suitable construction, which is driven by a separate electric motor 6, and the parts are so mounted on a transversely movable support as to be moved forward to cut the cable at a time determined by a cam mechanism. This support for the saw is in turn mounted on a flying carriage and arranged to be moved in the direction of cable travel. Just before the saw moves into contact with the cable, gripping members on the flying carriage are brought into engagement with the moving cable by means of a cam mechanism, and these gripping members cause the carriage to move along with the cable momentarily and thus hold the rotary saw in a fixed position relative to the moving cable during the time that it is cutting the same. This forward movement of the cable is preferably caused by the take-up reel 4 which is driven by a separate electric motor and friction drive. Immediately after the cable has been cut, the gripping mechanism is released and the rotary saw moves away from the cable to its initial position, and its driving motor comes to a stop. Then the free end of the cable which is thrust forward by the capstan 2 may be connected to another take-up reel 4 and the cable reeling operation continued.

Figure 4:
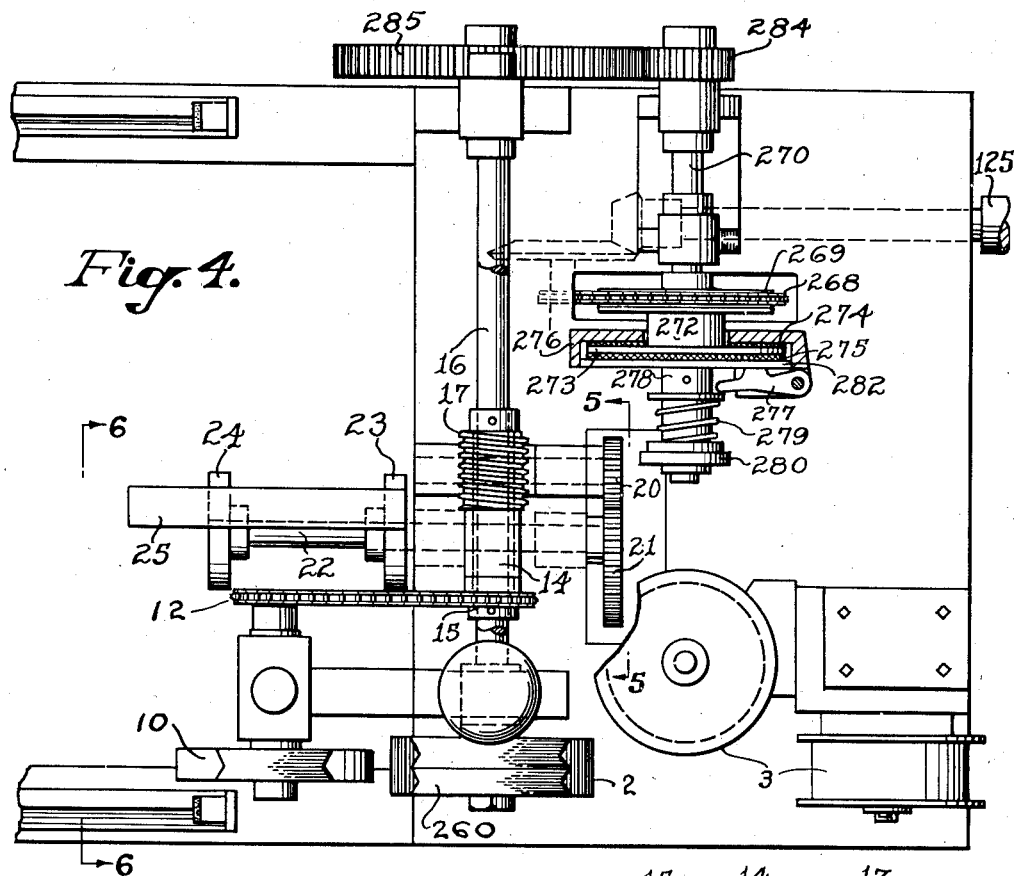
Fig. 4 is a top plan view of the mechanism shown in Fig. 3.

Immediately after the cable 1 leaves the capstan 2, it passes over a measuring wheel 10 and a spring pressed roller 11. The wheel 10 is turned by the cable passing thereover. A sprocket 12 (Figs. 3, 4 and 5) on the shaft 13 carrying the measuring wheel 10 drives a sleeve 14 which is connected to a sprocket 15 loosely mounted on the shaft 16. This sleeve 14 has a worm 17 on its opposite end which drives a worm gear 18 mounted on a further shaft 19, and the latter carries a small gear 20 meshing with a larger gear 21 on the shaft 22, all of which are suitably supported on the frame. This shaft 22 carries two disks 23 and 24 (Figs. 4 and 5) supporting a triangular cam bar 25 thereon in position for revolving about the axis of the shaft. The bar 25 has an extremely slow motion, in that it revolves only once for the required measurement of cable, such as 100 feet, which is to be wound on the take-up spool 4.

The rotary saw 5 (Figs. 9 and 10) has its axle mounted on a support 36 carried on a supporting plate 26 so arranged that the saw may be positioned close to the moving cable. The plate 26 is adjustably mounted on a swinging plate 27. The latter has an upstanding lip 28 through which passes an adjusting screw 29 engaging threads in the plate 26 and serving to adjust the two plates relative to each other. The plate 27 has a pair of downward projecting ribs 30 to which are pivoted the short links 31. There are four of these links arranged near the corners of the rectangular plate 27. These links are in turn supported on pivots 32 mounted on the sides of the flying carriage 8. The links 31 are of such length that the plates carrying the rotary saw may be swung from an inoperative position to cause the saw to cut through the cable.

The electric motor 6 is mounted on the top slide plate 26. It has a pulley and a belt 37 on one end of its shaft which drive the rotary saw. This motor is controlled through a starting resistance box 40 of suitable construction (Fig. 6) which has a control handle 42 mounted in the path of a pin 44 mounted on the disk 23 (Fig. 6) which carries one end of the cam bar 25. These parts and the electric circuit are so constructed and arranged that when the disk 23 has made a complete revolution, the pin 44 strikes the roller 45 on the upper end of the resistance control handle 42, which is pivoted at its lower end on the box 40, and thrusts it upwards to make the electric circuit and start the motor in operation and thus drive the rotary saw. Owing to the slow motion of the disk 23, the pin 44 remains in contact with the handle 42 for a sufficiently long time to effect the cutting off operation. The pin slips past the roller 45 on the end of the handle 42 by the time the cutting has been completed, and a spring 46 serves to draw the handle of the resistance box back to its initial position and thus break the circuit and stop the electric motor. This operation starts just prior to the contact of bar 25 with bell crank roll 87, to be described, and subsequent movement of the saw 5 to cut the cable.

The flying carriage 8 has V-shaped rollers 50 which ride on the interfitting guide tracks 52 which are arranged parallel with the cable movement. A weight 54 (Fig. 7) serves through a flexible cable 55 to return the carriage 8 towards the right (Fig. 1) when the grippers are released, and to hold it there in its idle position against bumpers 56 (Fig. 8) provided for the purpose.

Figures 5, 6:
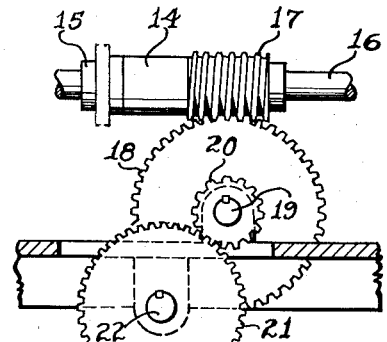
Fig. 5 is a sectional view on the line 5—5 of Fig. 4.
Fig. 6 is a detail showing the switch control mechanism taken on the line 6—6 of Fig. 4.

The forward motion of the swinging saw supporting plate and the clamping action which connects the flying carriage with the cable is controlled by means of a cam mechanism driven by the electric motor 6. To this end the motor is connected through a slow motion reduction gearing with the shaft 60 which has a sprocket 61 thereon arranged to drive through a chain a further sprocket 62 loosely mounted on a shaft 64 carried beneath the carriage 32. The sprocket 62 is fastened on a sleeve 66 which has three radially arranged notches 68 (Figs. 11, 12 and 13) in its end face. A sleeve 70 having an annular groove 71 therein is keyed to the outer end of the shaft 64. A dog 72 is slidably mounted in a slideway or slot 73 in the sleeve. This slot 73 extends radially inwardly of the sleeve 70 and is so arranged that the dog 72 slides parallel with the axis of the shaft 64. The dog 72 has a beveled surface 74 which is engaged by a correspondingly beveled surface on a rocking latch 78 which is pivoted at 79 (Fig. 7) on the framework of the carriage. The upper end of the rocking lever 78 is connected by a coiled spring 80 with a link 82 which is pivotally connected to one end of a bell crank lever 84 pivotally mounted at 85 on the side of the flying carriage 8. The lower end of the lever 84 has a roller 87 located in the path of revolution of the wedge shaped cam bar 25 (Figs. 6 and 7). These parts are so arranged that the forward radially arranged face of the bar 25 strikes the roller 87 and rocks the bell crank 84 and thus pulls the link 82 to the left and rocks the lower end of lever 78 to the right. The lever 78 has a pin 88 (Fig. 7) slidably mounted in a slot 89 in the link 82 which thus forms a support for the right hand end of the link. The lower end of lever 78 is held in its left hand position (Fig. 7) by a tension spring 90 suitably mounted on the carriage framework. A V-shaped latch 92 is pivotally mounted on the top end of the lever 78 and it has a lug adapted to lock over a projection 94 on the side of the link 82. The other end of the latch 92 is held to the right by means of a spring 96 which thus tends to hold the latch in a locked position. A pin 98 projecting from the periphery of the sleeve 70 and the V-shaped latch 92 are so located and arranged that the pin in its revolution is adapted to unlock the latch 92 and allow the rocking latch 78 to be moved by spring 90 into position to move the dog 72 towards the left (Fig. 13) and out of engagement with the slot 68 in the sleeve 66.

In the operation of this mechanism, when the cam bar 25 (Fig. 7) strikes the end of the bell crank 84 it pulls the lower end of lever 78 to the right through the action of the spring 80. The lower beveled end of the lever 78 slides off the beveled surface of the dog 72 and permits the spring 99 to push the dog into one of the three recesses 68 in the sleeve 66 when it reaches the same in its travel. The end of the dog 72 rests against the end surface of the sleeve 66 until it can drop into one of the radial slots 68. This connects the sleeve 70 (keyed to shaft 64) with the sprocket hub 66 and thus causes the motor to rotate the same shaft 64. The pin 98 (Fig. 7) will then travel a short distance and strike the lower end of the latch 92 and release it and permit the lower cam end of the rocking lever 78 to move again towards the left so as to engage the beveled cam of the revolving dog 72 when it presents itself, and thus removes it from engagement with one of the radial grooves 68 (Fig. 12). Thus the dog 72 can revolve only one revolution and the cam shaft likewise rotates but once before it stops. This takes place during the cable sawing operation.

The cam shaft 64 (Figs. 9 and 10) has two cams 100 and 102 thereon. The small cam 100 engages a roller on the end of a bell crank lever 104 pivoted centrally on a lug 105 depending from the carriage 8. The other end of this rocking lever 104 is T-shaped and provided with two screws 106 adjustably fitted therein, which engage the bottom ends of the two sliding rods 108 that are held in a downward position by means of spring 109 mounted between collars on the rods 108 and supporting lugs 110 on the carriage. The upper ends of these rods 108 are pivotally connected to the cable clamping levers 112 (Fig. 14) which are in turn pivoted at 113 on the framework on each side of the saw 5. The right hand end of each clamping lever has a semi-cylindrical clamp 114 removably secured thereto. The inner surface of each clamp 114 is shaped somewhat as a half nut so that it will fit against the convolutions of the armor. The cam 100 is so located on its cam shaft and is of such shape that it will force the clamping shoes 114 against the cable and hold it gripped in position until a low spot on the cam 100 permits disengagement thereof. Since the clamping arms 112 are secured to a bracket on the flying carriage, this clamping action, which takes place immediately after the bell crank 84 trips and cam shaft 64 starts to rotate, causes the carriage 8 to be drawn forward on its rollers 50 and to travel with the moving cable.

At substantially the same time as that of the clamping action, the other cam 102 on shaft 64 engages a roller on the lower end of the lever 120 which is a continuation of one of the links 31 (Fig. 9). This cam and the lever 120 are so shaped that the swinging plate 27 is caused to move forward with its rotary saw and cause the latter to engage and cut through the cable while the flying carriage is connected to it and moves therewith. By the time that operation has been completed, the tension spring 122 (Fig. 7) which connects pins on the upper and lower carriages is permitted by cam 102 to return the upper swinging carriage to an inoperative position. At the same time, the clamps 112 are released by their cam 100. The cable being fashioned continues to move forward and its free end is ready for connection to another take-up reel 4, which again draws the cable forward for another cycle of operations. As soon as the clamps are released, the carriage is returned on its rails by means of the weight 54 to its initial position.

It will be understood that the armored cable is drawn forward by both the capstan 2 and the take-up reel 4, and that the latter serves to draw the flying carriage forward. Hence, the reel 4 can be used in a simplified construction as the sole motive power for moving the cable. However, the capstan 2 is preferably used to prevent any interruption or delay in that forward movement. The capstan may be provided with teeth properly spaced to grip between the convolutions of the armor and thus force the armor to be drawn forward positively at a definite speed which is determined by the rotation of the capstan, thus making it possible to correlate the speed of the cable with the armoring operation. The cable is looped around the two rollers 3, the right hand one of which is arranged to revolve freely about a horizontal axis (Fig. 3), suitable bearing supports being provided for this purpose. The rollers are of small diameter and the force applied to the cable by the capstan causes the formed interlocking convolutions of the cable to stretch in order to make the circuit of small radius, and this makes the cable more flexible. A spring pressed roller 260 suitably mounted in the framework above the capstan serves to hold the cable in tight engagement therewith.

The drive for the various mechanisms is taken from the power shaft 125 passing along near the base of the machine and mounted in suitable bearings on the framework. This shaft (Figs. 3 and 4) has a beveled gear 264 on its end meshing with a further bevel gear 265 which is keyed to a cross shaft 266. This shaft carries a sprocket 267 which drives a chain 268 and that in turn drives a sprocket 269 (Fig. 4) loosely mounted on a shaft 270 which is suitably mounted in bearings on the framework. The sprocket 269 has a hub 272 which in turn carries a friction disk 273 having extension plane friction surfaces on its opposite sides. A pair of fiber washers 274 and 275 engage the opposite sides of this disk. The washer 274 rests against the inner plane face of the housing 276. The other fiber washer 275 bears on its outer side against a disk 282 which is integral with the hub 278 pinned to the shaft 270. A spring 279 held in place against a nut 280 on the hub 278 bears against a set of latches 277 pivoted on ears on the housing 276. These latches are thus forced by the spring against the outer face of the disk 282. This causes the fiber washers to frictionally press against the flange 273 of the hub 272 and thus to transmit the driving force from the sprocket 269 to the shaft 270. The outer end of the shaft 270 carries a gear 284 which meshes with the gear 285 fixed on the shaft 16. This shaft 16 carries the capstan 2 keyed on its outer end. Thus, the capstan is frictionally driven by the main motor, and in timed relation with the other parts, but slippage may be had if at any time needed. The gears 284 and 285 may be replaced by gears of different teeth ratio and thus change the driving speed thereof.

The take-up reeling mechanism which winds the cable on the spools 4 may be made in accordance with the construction shown in the U. S. patent to Sleeper and Blount No. 1,753,950. This comprises in general two spools or reels 4 driven by a separate electric motor. The motor is connected to the reels by a friction driving mechanism which operates through a suitable clutch and gearing to drive either one or the other of these take-up reels. Traverse mechanism may also be provided for laying the cable properly in a helical position on the reel. The particular construction of that mechanism forms no part of the present invention except in so far as the take-up reel serves as a motive power to draw the flying carriage forward during the cutting-off operation.

It will now be appreciated that many modifications may be made in this invention, and that various sub-combinations of the machine may be employed without using other features of the assembly. For example, the flying carriage and cutter mechanism may be employed with or without the measuring device for cutting other types of cable, which term is to be interpreted as covering wire, rods, tubes, rails and other long shaped articles that are to be cut into shorter lengths. This construction is particularly useful for cutting long articles as they travel longitudinally from one operation to another, such as between the operations of drawing and spooling a wire or during the step of rolling out a rod, rail, bar or other required shape wherein a predetermined length is to be cut from a piece that is being fashioned. It will also be understood that other suitable types of cutting implements may be used, depending upon the nature, shape and size of the article to be cut. In each of these fields of utility, the cutter is mounted on a flying carriage which is temporarily connected to and drawn along by the moving article to be cut; and the cutter and associated parts are so constructed and arranged that the cutter will operate during movement of the flying carriage and serve to sever the moving body without interfering with its forward movement.

The above disclosure is therefore to be considered as being merely illustrative of the general principles of the invention and not as limiting it to the specific structure shown in the drawings; hence the claims are to be interpreted accordingly.

We claim:

1. A cable cutting machine comprising means for drawing cable from a source of supply, a flying carriage located between said means and the source of cable supply for movement longitudinally with the moving cable, a cutter on the carriage which is movable transversely to cut the cable, means for temporarily connecting the carriage to the cable so that it will be drawn forward by the cable movement and means for moving the cutter to sever the cable while the carriage moves therewith.

2. A cable cutting machine comprising means for drawing a cable longitudinally forward, a flying carriage arranged at the rear of said means to be moved longitudinally with the cable, a cutter on the carriage which is movable transversely to cut the cable, mechanism for temporarily connecting the carriage to the cable so that it will be drawn forward solely by the cable movement, a device for measuring a predetermined length of the moving cable, means controlled by said measuring device which causes said mechanism to connect the carriage to the cable and means for moving the cutter transversely to sever the cable while the carriage moves therewith.

3. A cable cutting mechanism comprising means for drawing a cable longitudinally forward, a flying carriage arranged at the rear of said means for movement longitudinally with the cable, a cutter on the carriage which is movable transversely to cut the cable, a cable gripping mechanism secured on the carriage for temporarily connecting the carriage to the moving cable so that it will be drawn forward by the cable movement caused by said means, control mechanism for causing said gripping mechanism to connect the carriage temporarily to the moving cable and means operable in timed relationship with said control mechanism for moving the cutter forward to sever the cable while the carriage is drawn forward thereby.

4. A cable cutting mechanism comprising means for drawing a cable longitudinally forward, a flying carriage arranged at the rear of said means for movement longitudinally with the cable, a cutter on the carriage which is movable transversely to cut the cable, a cable gripping mechanism secured on the carriage for temporarily connecting the carriage to the moving cable so that it will be drawn forward by the cable movement caused by said means, control mechanism for causing said gripping mechanism to connect the carriage temporarily to the moving cable, means operable in timed relationship with said control mechanism for moving the cutter forward to sever the cable while the carriage is drawn forward thereby and power driven mechanism for continuing the forward movement of the rear portion of the cable after it has been severed.

5. A cable cutting machine comprising means for drawing cable from a source of supply, a flying carriage arranged for longitudinal movement with the cable, a cutter on the carriage which is movable transversely thereof to cut the cable, a measuring device past which the cable moves continuously, means controlled by the measuring device which causes the carriage to be moved longitudinally with the cable and the cutter to be moved simultaneously to cut the same, and means for continuing the movement of the cable from the source of supply after the forward end of the cable has been cut off.

6. A cable cutting machine comprising means for drawing a cable from a source of supply, a flying carriage mounted to move forward with the cable, a cutter mounted to move transversely of the carriage and to cut the cable, a measuring device operated by movement of the cable past the same, clamping members on the carriage for temporarily gripping the cable and serving alone to draw the carriage forward, mechanism controlled by said device and operable when a predetermined length of cable has passed the same which causes said gripping members to grip the cable and move the carriage forward, and mechanism operated in timed relationship therewith which causes the cutter to move forward and sever the cable while the carriage is moving therewith.

7. A cable cutting machine comprising a reel for drawing a cable longitudinally from a source of supply, a flying carriage mounted to move with the cable, a cutter mounted to move transversely of the carriage to sever the cable, a measuring device operable by movement of the cable past the same, mechanism controlled by said measuring device for causing the carriage to move with the cable and the cutter to sever the cable when a predetermined length of cable has passed the measuring device, and means for continuing the movement of the cable from the source of supply after the forward end thereof has been severed so that the cable may move uninterruptedly through the machine.

8. A cable cutting machine comprising power driven means for drawing a cable longitudinally forward, a flying carriage arranged at the rear of said means for longitudinal movement with the cable, a cutter on the carriage which is movable transversely thereof to cut the cable, a measuring device past which the cable moves continuously, a cable gripping mechanism on the carriage arranged to grip the cable and connect the carriage thereto so that it will be drawn forward by said power driven means and the moving cable, cam mechanism controlled by said measuring device which causes the gripping mechanism to grip the cable and cause the carriage to move therewith, and cam mechanism controlled by said measuring device which causes the cutter to cut the cable while the carriage is moving therewith.

WILLIAM H. BLOUNT.
CLAYTON F. FISHER.